(12) United States Patent
Mashiko et al.

(10) Patent No.: US 11,606,467 B2
(45) Date of Patent: Mar. 14, 2023

(54) INFORMATION PROCESSING APPARATUS, OUTPUT METHOD, AND NON-TRANSITORY COMPUTER-READABLE STORAGE MEDIUM WHICH HIGHLIGHTS AN ABNORMALITY BEFORE CORRECTION

(71) Applicants: Yohta Mashiko, Tokyo (JP); Tadashi Kitai, Kanagawa (JP); Akira Masuda, Tokyo (JP); Takahiro Koyama, Kanagawa (JP); Kengo Yamamoto, Kanagawa (JP)

(72) Inventors: Yohta Mashiko, Tokyo (JP); Tadashi Kitai, Kanagawa (JP); Akira Masuda, Tokyo (JP); Takahiro Koyama, Kanagawa (JP); Kengo Yamamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/383,454

(22) Filed: Jul. 23, 2021

(65) Prior Publication Data
US 2022/0028047 A1    Jan. 27, 2022

(30) Foreign Application Priority Data

Jul. 27, 2020    (JP) .............................. JP2020-126830

(51) Int. Cl.
*H04N 1/00* (2006.01)
(52) U.S. Cl.
CPC ..... *H04N 1/00005* (2013.01); *H04N 1/00015* (2013.01); *H04N 1/00034* (2013.01);
(Continued)

(58) Field of Classification Search
CPC .......................... H04N 1/00002–00092; H04N 1/0044–00461; H04N 1/00663
See application file for complete search history.

(56) References Cited

U.S. PATENT DOCUMENTS 4,965,597 A * 10/1990 Ohigashi ................ H04N 1/047
399/178
9,524,545 B2 * 12/2016 Fukase ................ B41F 33/0036
(Continued)

FOREIGN PATENT DOCUMENTS

JP    2013-057661    3/2013

*Primary Examiner* — Scott A Rogers
(74) *Attorney, Agent, or Firm* — Xsensus LLP

(57) ABSTRACT

An information processing apparatus includes circuitry. The circuitry is configured to acquire read image data of an image formed on a recording medium. The circuitry is configured to acquire output target image data according to which the image is formed. The circuitry is configured to generate, based on the output target image data, inspection image data for inspection of the read image data. The circuitry is configured to compare the read image data corrected based on an amount of deviation caused by conveyance of the recording medium with the inspection image data generated, to detect an image abnormality. The circuitry is configured to highlight and output a position of a portion of the image abnormality in the read image data before correction, based on the amount of deviation caused by conveyance of the recording medium, in response to the image abnormality being detected.

7 Claims, 11 Drawing Sheets

(52) U.S. Cl.
CPC ....... *H04N 1/0044* (2013.01); *H04N 1/00045* (2013.01); *H04N 1/00076* (2013.01)

(56) References Cited

U.S. PATENT DOCUMENTS

| | | | |
|---|---|---|---|
| 11,230,121 B2* | 1/2022 | Chuto | B41J 11/0095 |
| 11,275,534 B2* | 3/2022 | Sakurai | G06F 3/1208 |
| 11,323,575 B2* | 5/2022 | Tatsuda | H04N 1/00005 |
| 2013/0016374 A1 | 1/2013 | Kawamoto et al. | |
| 2013/0044342 A1 | 2/2013 | Kaneko et al. | |
| 2013/0044347 A1 | 2/2013 | Kitai et al. | |
| 2013/0250319 A1 | 9/2013 | Kaneko et al. | |
| 2013/0250369 A1 | 9/2013 | Kitai et al. | |
| 2013/0250370 A1 | 9/2013 | Kojima et al. | |
| 2013/0250377 A1 | 9/2013 | Kitai et al. | |
| 2013/0250378 A1 | 9/2013 | Kitai et al. | |
| 2014/0036290 A1 | 2/2014 | Miyagawa et al. | |
| 2014/0079292 A1 | 3/2014 | Kaneko et al. | |
| 2014/0079293 A1 | 3/2014 | Kitai et al. | |
| 2014/0268259 A1 | 9/2014 | Kitai | |
| 2014/0268260 A1 | 9/2014 | Kitai et al. | |
| 2015/0063654 A1 | 3/2015 | Kitai | |
| 2015/0269719 A1 | 9/2015 | Kitai | |
| 2016/0004419 A1* | 1/2016 | Nakamura | G06F 40/274 715/771 |
| 2016/0274823 A1 | 9/2016 | Mashiko | |
| 2017/0031636 A1 | 2/2017 | Kitai | |
| 2017/0351464 A1 | 12/2017 | Mashiko | |
| 2020/0236225 A1* | 7/2020 | Hongo | H04N 1/00045 |
| 2021/0064204 A1* | 3/2021 | Furutani | G06F 3/04883 |

* cited by examiner

|  | −1/4 |  |
|---|---|---|
| −1/4 | 1 | −1/4 |
|  | −1/4 |  |

FIG. 9A

| -1 | -1 | -1 | -1 | -1 |
|---|---|---|---|---|
| -1 | -1 | -1 | -1 | -1 |
| -1 | -1 | 1 | 1 | 1 |
| -1 | -1 | 1 | 1 | 1 |
| -1 | -1 | 1 | 1 | 1 |

FIG. 9B

| -1 | -1 | -1 | -1 | -1 |
|---|---|---|---|---|
| -1 | -1 | -1 | -1 | -1 |
| 1 | 1 | 1 | -1 | -1 |
| 1 | 1 | 1 | -1 | -1 |
| 1 | 1 | 1 | -1 | -1 |

FIG. 9C

| -1 | -1 | 1 | 1 | 1 |
|---|---|---|---|---|
| -1 | -1 | 1 | 1 | 1 |
| -1 | -1 | 1 | 1 | 1 |
| -1 | -1 | -1 | -1 | -1 |
| -1 | -1 | -1 | -1 | -1 |

FIG. 9D

| 1 | 1 | 1 | -1 | -1 |
|---|---|---|---|---|
| 1 | 1 | 1 | -1 | -1 |
| 1 | 1 | 1 | -1 | -1 |
| -1 | -1 | -1 | -1 | -1 |
| -1 | -1 | -1 | -1 | -1 |

| NUMBER | #1 | #2 | #3 | ... |
|---|---|---|---|---|
| X COORDINATE | | | | |
| Y COORDINATE | | | | |
| TARGET PLANE | B | R,G | R,G,B | ... |

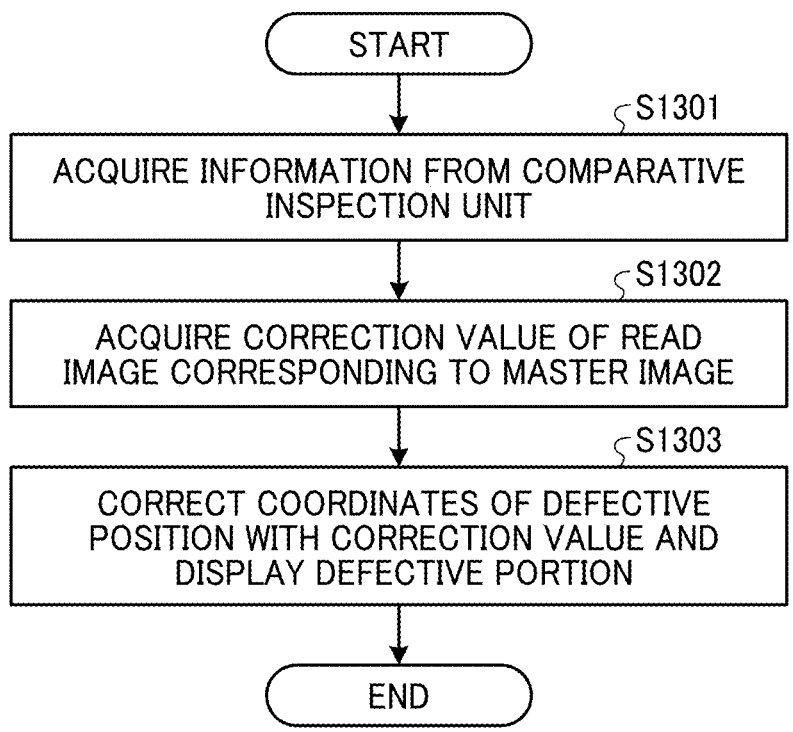

INFORMATION PROCESSING APPARATUS, OUTPUT METHOD, AND NON-TRANSITORY COMPUTER-READABLE STORAGE MEDIUM WHICH HIGHLIGHTS AN ABNORMALITY BEFORE CORRECTION

CROSS-REFERENCE TO RELATED APPLICATION

This patent application is based on and claims priority pursuant to 35 U.S.C. § 119(a) to Japanese Patent Application No. 2020-126830, filed on Jul. 27, 2020, in the Japan Patent Office, the entire disclosure of which is hereby incorporated by reference herein.

BACKGROUND

Technical Field

Embodiments of the present disclosure relate to an information processing apparatus, an output method, and a non-transitory computer-readable storage medium storing program code that causes a computer to perform the output method.

Related Art

There is known a technique of determining whether a printed matter on which an image is formed according to print data is defective. For example, there is known a technique of comparing corresponding portions of a reference image generated from print data and a read image generated from an image read by a reading device and determining whether the printed matter is defective based on a difference between the corresponding portions.

SUMMARY

In one embodiment of the present disclosure, a novel information processing apparatus includes circuitry. The circuitry is configured to acquire read image data of an image formed on a recording medium. The circuitry is configured to acquire output target image data according to which the image is formed. The circuitry is configured to generate, based on the output target image data, inspection image data for inspection of the read image data. The circuitry is configured to compare the read image data corrected based on an amount of deviation caused by conveyance of the recording medium with the inspection image data generated, to detect an image abnormality. The circuitry is configured to highlight and output a position of a portion of the image abnormality in the read image data before correction, based on the amount of deviation caused by conveyance of the recording medium, in response to the image abnormality being detected.

Also described are novel information processing apparatus and output method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9A is a diagram illustrating a first corner detection filter;

FIG. 9B is a diagram illustrating a second corner detection filter;

FIG. 9C is a diagram illustrating a third corner detection filter;

FIG. 9D is a diagram illustrating a fourth corner detection filter;

FIG. 14 is a flowchart of a process of outputting information indicating a defective portion;

Figure 1:
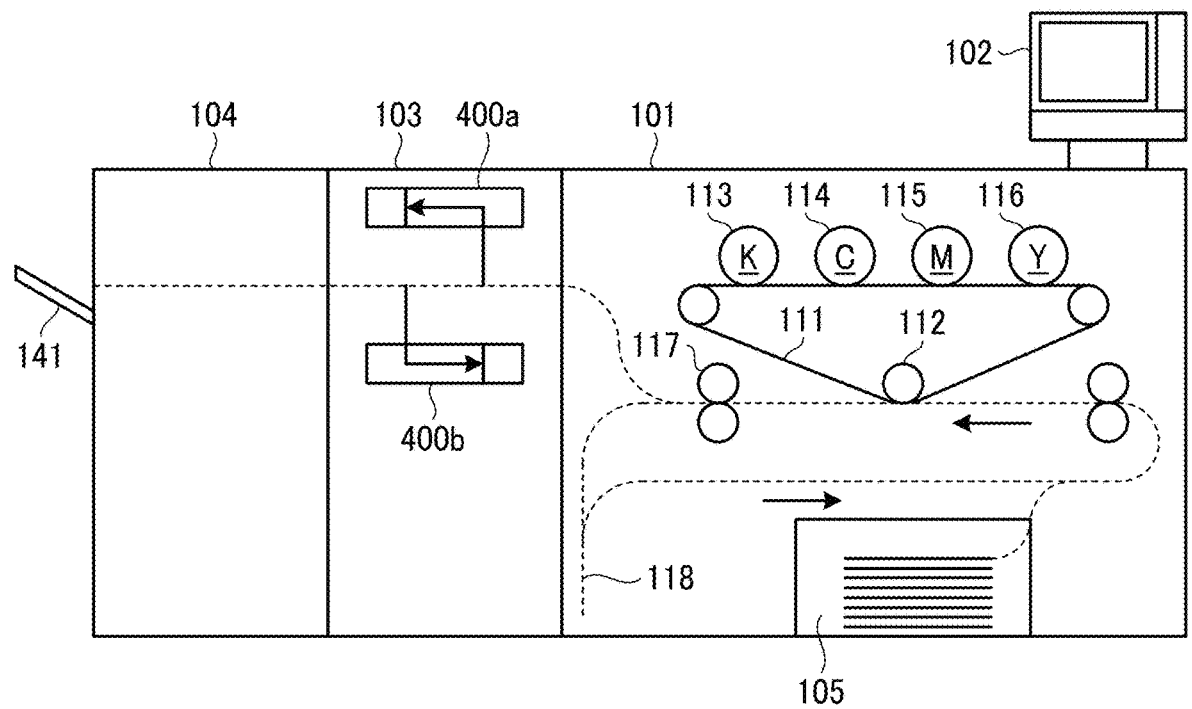
FIG. 1 is a diagram illustrating a configuration of an image processing system including an inspecting apparatus and a printer (as a printing apparatus) coupled to the inspecting apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. As used herein, the singular forms "a," "an," and "the" are intended to include the plural forms as well, unless the context clearly indicates otherwise.

In a later-described comparative example, embodiment, and exemplary variation, for the sake of simplicity, like reference numerals are given to identical or corresponding constituent elements such as parts and materials having the same functions, and redundant descriptions thereof are omitted unless otherwise required.

It is to be noted that, in the following description, suffixes Y, M, C, and K denote colors of yellow, magenta, cyan, and black, respectively. To simplify the description, these suffixes are omitted unless necessary.

Referring to the drawings, wherein like reference numerals designate identical or corresponding parts throughout the several views, embodiments of the present disclosure are described below.

The following describes an example in which an inspecting apparatus (as an information processing apparatus) and a printer (as an image forming apparatus) are applied to a system including a printing apparatus such as a production printing machine that continuously prints a large number of recording media in a short time. However, the embodiments of the present disclosure are not limited to such a case.

Initially with reference to FIG. 1, a description is given of a configuration of an image processing system according to an embodiment of the present disclosure.

FIG. 1 is a diagram illustrating a configuration of an image processing system including an inspecting apparatus 103 (serving as an information processing apparatus) and a printer 101 (serving as a printing apparatus or an image forming apparatus) coupled to the inspecting apparatus 103 according to the present embodiment.

The printer 101 is an apparatus that forms and outputs an image on a sheet (specifically, on a surface of a sheet). The printer 101 includes an operation device 102 such as a touch panel serving as a display on one hand, a sheet feeder 105, a belt 111, a roller 112, a drum 113, a drum 114, a drum 115, a drum 116, a roller 117, and a reverse passage 118 defined by internal components of the printer 101. When receiving, according to an operation via the operation device 102, print information (as a print job) including a print image (which is a raster image processor (RIP) image) from the outside or when receiving an instruction to execute a print job stored in the printer 101, the printer 101 executes the print job. According to the print job, the printer 101 conveys a sheet (as a recording medium) supplied from the sheet feeder 105 along a passage indicated by a dotted line in FIG. 1.

The drums 113, 114, 115, and 116 superimpose toner images of black (K), cyan (C), magenta (M), and yellow (Y), respectively, on the belt 111 one atop another to form a composite toner image on the belt 111. The roller 112 transfers the composite toner image from the belt 111 onto the sheet conveyed. The roller 117 fixes the composite toner image onto the sheet. Note that the drums 113, 114, 115, and 116 bear toner images formed in an electrophotographic system, that is, in a series of electrophotographic processes including a charging process, an exposure process, and a developing process.

In the case of single-sided printing, the sheet is ejected to the inspecting apparatus 103 after the toner image is fixed onto the sheet. By contrast, in the case of double-sided printing, the sheet is reversed on the reverse passage 118 so that another toner image is transferred and fixed onto another side of the sheet. Finally, the sheet is ejected.

The inspecting apparatus 103 is an apparatus that inspects the sheet (as a recording medium) bearing an image formed and output by the printer 101. Specifically, the inspecting apparatus 103 reads a print output from the printer 101 and inspects the print output thus read, to determine whether printing is normally performed. The inspecting apparatus 103 compares a read image obtained by the reading with a master image generated on the assumption of raster image processing, printing, and reading of document image data prepared by a user, thus inspecting the printing quality.

The inspecting apparatus 103 includes reading devices 400, specifically, a reading device 400a and a reading device 400b. The inspecting apparatus 103 is coupled to a sheet ejection stacker 104 and an output tray 141.

With the reading device 400a and the reading device 400b, the inspecting apparatus 103 reads images printed on both sides of the sheet ejected from the printer 101. Then, the inspecting apparatus 103 ejects the sheet onto the output tray 141 of the sheet ejection stacker 104. Thus, a plurality of sheets is stacked on the output tray 141.

Figure 2:
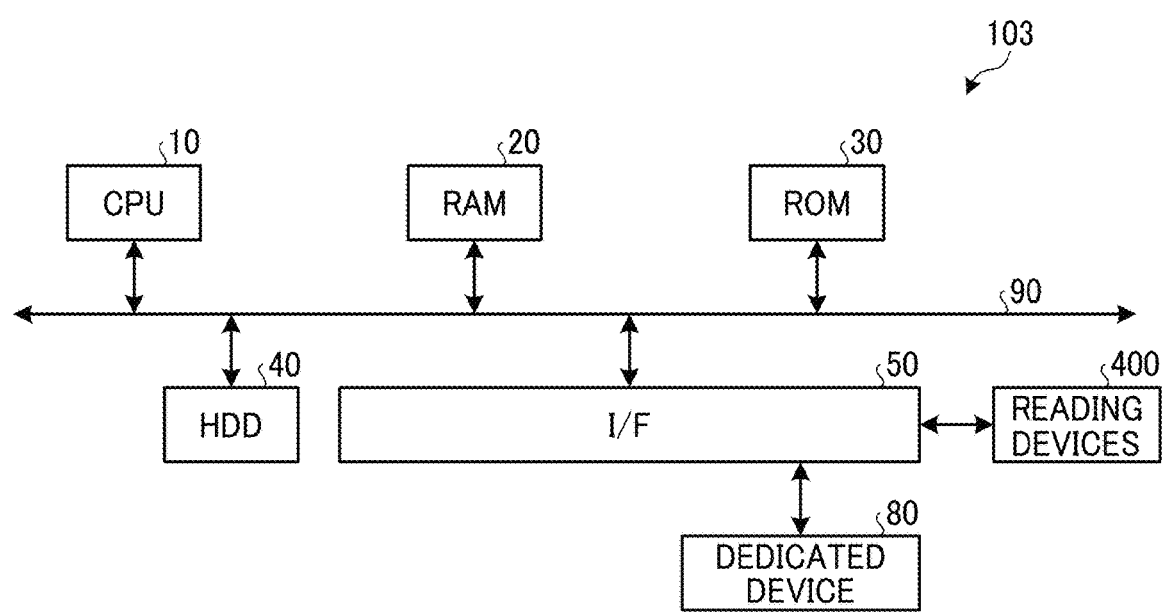
FIG. 2 is a block diagram illustrating a hardware configuration of the inspecting apparatus of FIG. 1.

Referring now to FIG. 2, a description is given of hardware components of the inspecting apparatus 103.

FIG. 2 is a block diagram illustrating a hardware configuration of the inspecting apparatus 103 according to the present embodiment.

As illustrated in FIG. 2, the inspecting apparatus 103 has substantially the same hardware configuration as a hardware configuration of an information processing apparatus such as a general personal computer (PC) or a server. Specifically, the inspecting apparatus 103 includes a central processing unit (CPU) 10, a random access memory (RAM) 20, a read only memory (ROM) 30, a hard disk drive (HDD) 40, and an interface (I/F) 50, which are connected to each other via a bus 90. The reading devices 400 and a dedicated device 80 are connected to the I/F 50.

The CPU 10 is an arithmetic unit and controls an entire operation of the inspecting apparatus 103. The RAM 20 is a volatile storage medium that allows data to be read and written at high speed. The CPU 10 uses the RAM 20 as a work area for data processing. The ROM 30 is a read-only, non-volatile storage medium that stores programs such as firmware. The HDD 40 is a non-volatile storage medium that allows data to be read and written. The HDD 40 stores an operating system (OS), various kinds of control programs, and application programs.

The I/F 50 connects the bus 90 to various kinds of hardware components or a network and controls the connection (i.e., the communication). The dedicated device 80 is an arithmetic device dedicated to high-speed image processing. Such an arithmetic device is configured as an application-specific integrated circuit (ASIC), for example. The image processing in the reading devices 400 that read an image output on a surface of a sheet is also implemented by the dedicated device 80. The reading devices 400 are, e.g., line scanners or sheet-through scanners disposed beside a conveyance passage defined by internal components of the inspecting apparatus 103. The reading devices 400 include a plurality of recording elements in a direction perpendicular to a direction in which the sheet (as a recording medium) is conveyed. Note that the inspecting apparatus 103 may further include a display.

In such a hardware configuration, the CPU 10 executes calculation according to a program stored in the ROM 30 or a program read from a storage medium such as the HDD 40 or an optical disk and loaded into the RAM 20, thus functioning as a software controller. The software controller cooperates with hardware to implement functions, illustrated as functional blocks, of the inspecting apparatus 103.

A program executed by the inspecting apparatus 103 of the present embodiment is stored in a computer-readable storage medium in an installable or executable file format and provided. Examples of the computer-readable storage medium include, but are not limited to, a compact disc read-only memory (CD-ROM), a flexible disk (FD), a compact disc recordable (CD-R), and a digital versatile disk (DVD).

Alternatively, the program executed by the inspecting apparatus 103 of the present embodiment may be stored on a computer connected to a network such as the Internet and downloaded via the network, to be provided. Alternatively, the program executed by the inspecting apparatus 103 of the present embodiment may be provided or distributed via a network such as the Internet.

Figure 3:
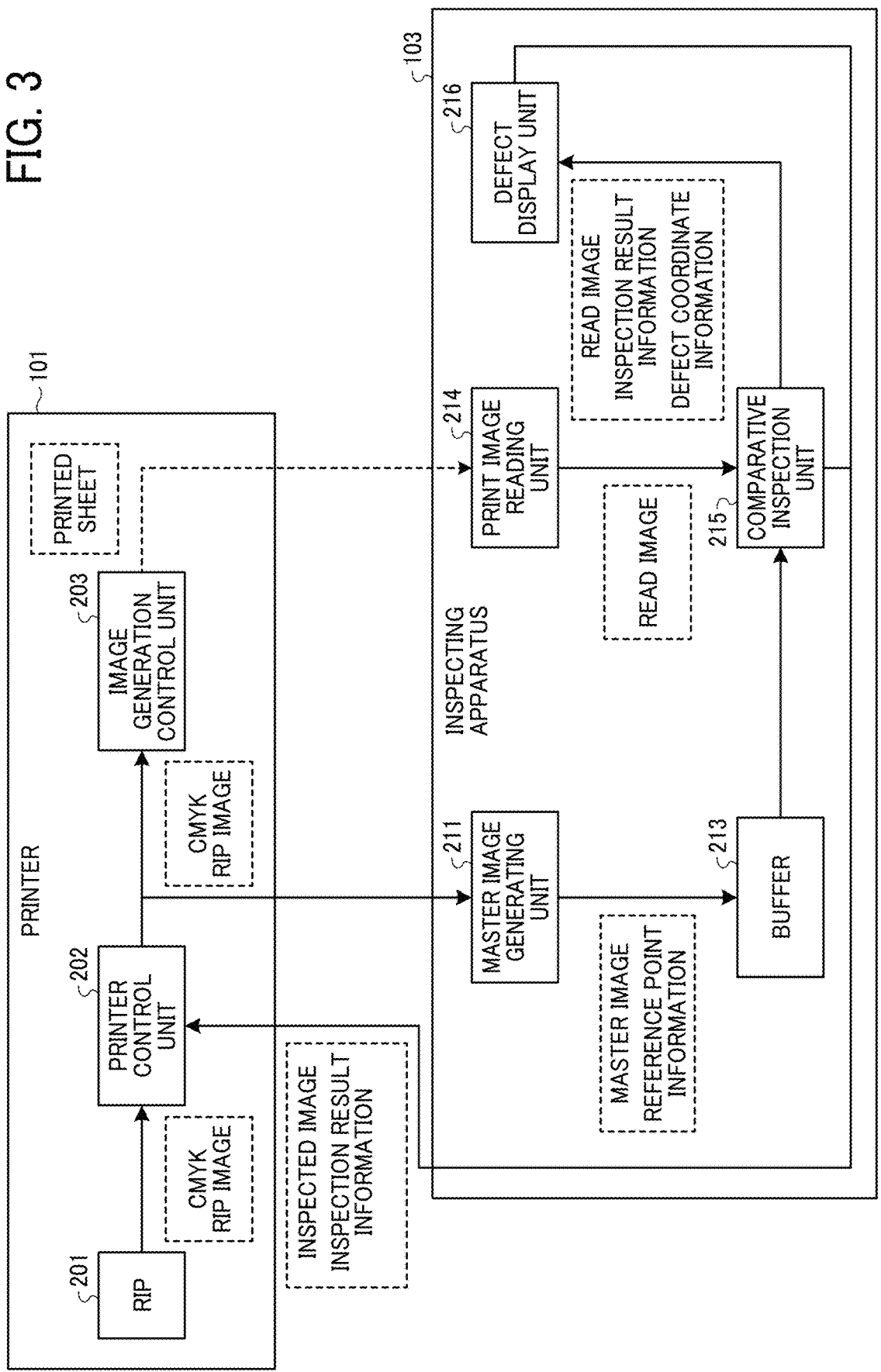
FIG. 3 is a block diagram illustrating a functional configuration of the printer and the inspecting apparatus of the image processing system of FIG. 1.

Referring now to FIG. 3, a description is given of functions of the printer 101 and the inspecting apparatus 103.

FIG. 3 is a block diagram illustrating a functional configuration of the printer 101 and the inspecting apparatus 103 of the image processing system according to the present embodiment.

As illustrated in FIG. 3, the printer 101 according to the present embodiment includes an RIP 201, a printer control unit 202, and an image generation control unit 203.

The RIP 201 is a so-called raster image processor. The RIP 201 generates bitmap data (or an RIP image) from image data included in a print job for the printer 101 to execute image formation. For example, the RIP 201 acquires a page description language (PDL) such as PostScript or an image such as Tag Image File Format (TIFF) from, e.g., an external device and generates an RIP image having CMYK planes.

Here, the bit map data is information of pixels that construct an image to be formed. The image generation control unit 203, which will be described later, executes image formation according to a binary image. On the other hand, the image data included in the print job is generally a multi-level image having 256 tones, for example. Therefore, the RIP 201 converts image data of a multilevel image into bitmap data of a binary image. Here, the bitmap data is, e.g., data of 1 bit for each of the CMYK colors and of 600 dots per inch (dpi).

The printer control unit 202 sends the RIP image acquired from the RIP 201 to the inspecting apparatus 103 and the image generation control unit 203. That is, when acquiring the RIP image from the RIP 201, the printer control unit 202 sends the acquired RIP image to the inspecting apparatus 103 and the image generation control unit 203. Thus, the printer control unit 202 distributes the RIP image to the image generation control unit 203 and the inspecting apparatus 103.

The printer control unit 202 also acquires information on a result of inspection performed by the inspecting apparatus 103. The printer control unit 202 acquires, as the information on the result of inspection, information indicating the result of inspection (i.e., information indicating whether a portion of an image abnormality is detected) and an inspected image, which is an image subjected to inspection. When acquiring the information on the result of inspection, the printer control unit 202 outputs the information on the result of inspection to the operation device 102 serving as a display so that the operation device 102 displays the information on the result of inspection. For example, when acquiring an image highlighting a portion of an image abnormality from the inspecting apparatus 103 as an inspected image, the printer control unit 202 outputs the image highlighting the portion of the image abnormality to the operation device 102 so that the operation device 102 displays the image.

The RIP image is printed on a surface of a sheet by the image generation control unit 203. That is, the RIP image is an output target image to be formed and output. The printer control unit 202 sends the RIP image to the inspecting apparatus 103. That is, the printer control unit 202 serves as an output target image sending unit.

The image generation control unit 203 forms an image on a recording medium (e.g., a sheet of paper) according to the RIP image acquired from the printer control unit 202 and outputs, as a printed matter, the printed sheet, which is the recording medium bearing the image. In the present embodiment, the printer 101 forms an image by electrophotography as described above. Alternatively, however, the printer 101 may employ an inkjet printing system to form an image.

As described above, the image generation control unit 203 forms and outputs an RIP image on a surface of a sheet. That is, the image generation control unit 203 serves as an image forming and outputting unit.

With continued reference to FIG. 3, a description is given of a functional configuration of the inspecting apparatus 103. The inspecting apparatus 103 includes a master image generating unit 211, a buffer 213, a print image reading unit 214, a comparative inspection unit 215, and a defect display unit 216 (serving as an output unit).

The master image generating unit 211 serving as an inspection image generating unit acquires the binary image (i.e., the RIP image) input from the printer 101 as described above to generate master image data as inspection image data indicating an inspection image (i.e., a master image) to be compared with an inspection target image (i.e., a read image). In short, the master image generating unit 211 generates inspection image data for inspection of the read image data. The master image generated by the master image generating unit 211 is, e.g., data of 8 bits for each of red, green, and blue (RGB) colors and of 200 dpi. The master image generating unit 211 is implemented by execution of a program by the CPU 10 illustrated in FIG. 2, for example.

While generating the master image data based on the binary image input from the printer 101 as described above, the master image generating unit 211 edits the master image to determine a reference for aligning the read image, which is an image indicated by read image data, and the mater image, which is an image indicated by the master image data. A detailed description of a process of editing the master image is deferred. The master image generating unit 211 registers, in the buffer 213, the master image and reference point information, which is information as a reference for the alignment.

The buffer 213 stores information generated by the master image generating unit 211. The buffer 213 is implemented by the RAM 20 or the HDD 40 illustrated in FIG. 2.

The print image reading unit 214 serving as an image acquiring unit reads, with a reading device such as an inline sensor, an image formed on a surface of a printed sheet that is subjected to image formation (i.e., printing) and output by the printer 101, to acquire read image data of the image. The read image data acquired by the print image reading unit 214 is a target for the inspecting apparatus 103 to inspect. The read image data acquired by the print image reading unit 214 is, e.g., data of 8 bits for each of RGB colors and of 200 dpi. The print image reading unit 214 is implemented by execution of a program by the CPU 10, the reading devices 400, and the dedicated device 80 illustrated in FIG. 2.

The comparative inspection unit 215 compares the read image data input from the print image reading unit 214 with the master image data generated by the master image generating unit 211 to determine whether the image formation and output is executed as intended and detect an image abnormality (i.e., an abnormality in a read image). That is, the comparative inspection unit 215 serves as an image inspecting unit that compares the read image data input from the print image reading unit 214 with the master image data generated by the master image generating unit 211 to perform inspection. The comparative inspection unit 215 is implemented by execution of a program by the CPU 10 illustrated in FIG. 2, for example.

When comparing the read image data input from the print image reading unit 214 with the master image data generated by the master image generating unit 211 and detecting no abnormality in the read image, the comparative inspection unit 215 sends, to the printer 101, information indicating that the read image is normal, as inspection result information. By contrast, when comparing the read image data input from the print image reading unit 214 with the master image data generated by the master image generating unit 211 and detecting an abnormality in the read image, the comparative inspection unit 215 sends, to the defect display unit 216, the read image data, the inspection result information, and defect coordinate information. Here, the inspection result information includes information indicating an image abnormality. The defect coordinate information is information indicating the coordinates of a defective portion (i.e., a portion of an image abnormality).

The defect display unit 216 outputs a result of inspection performed by the comparative inspection unit 215. Specifically, when the comparative inspection unit 215 compares the read image data with the master image data and detects an image abnormality, the defect display unit 216 outputs information highlighting a position of a portion of the image abnormality in the read image. The comparative inspection unit 215 is implemented by execution of a program by the CPU 10 illustrated in FIG. 2, for example.

Figure 4:
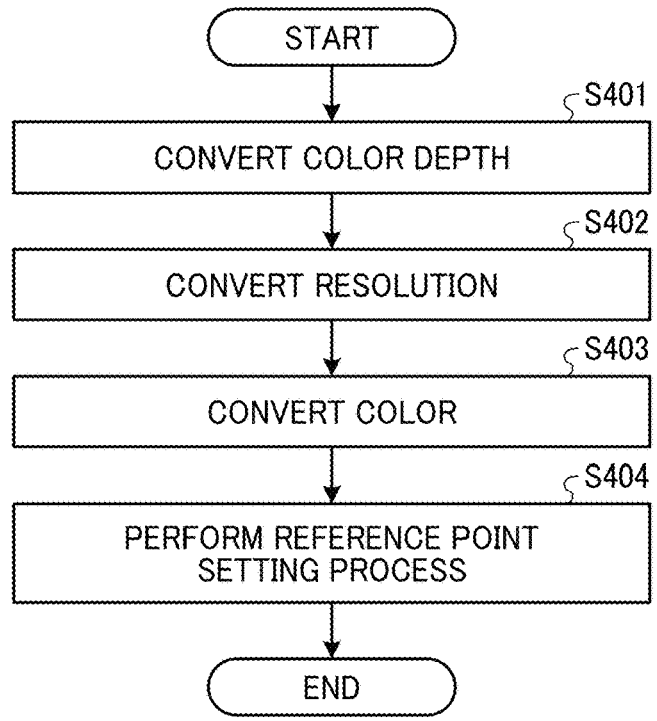
FIG. 4 is a flowchart of an operation of generating master image data.

Referring now to FIG. 4, a description is given of an operation of generating master image data by the master image generating unit 211.

FIG. 4 is a flowchart of an operation of generating master image data according to the present embodiment.

As illustrated in FIG. 4, in step S401, when acquiring a binary image from the printer 101, the master image generating unit 211 converts the image data of CMYK binary image, that is, image data of 1-bit pixels, into image data of 8-bit pixels. In short, the master image generating unit 211 converts the color depth.

In step S402, the master image generating unit 211 converts the resolution of the image data of 8-bit pixels (i.e., image data of 600 dpi) to 200 dpi, which is a reading resolution of the inline scanner.

In step S403, the master image generating unit 211 converts the image data of 8-bit CMYK pixels into image data of 24-bit RGB pixels. In short, the master image generating unit 211 converts the color.

By the operations of steps S401 to S403, the master image generating unit 211 converts the image data input in the CMYK binary format into image data in a format corresponding to the read image data generated by the print image reading unit 214, thus generating master image data.

Thereafter, in step S404, the master image generating unit 211 performs a reference point setting process to align the generated master image data and the read image data on the master image data.

Figure 5:
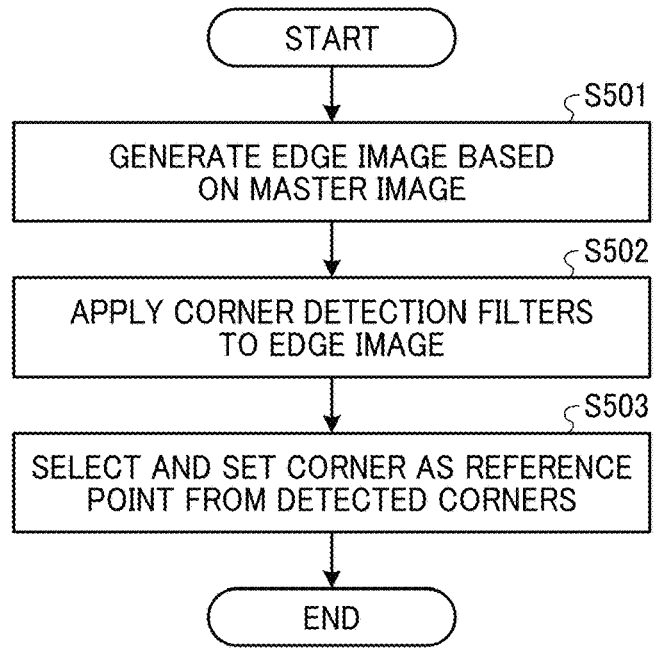
FIG. 5 is a detailed flowchart of a reference point setting process.

Referring now to FIG. 5, a detailed description is given of the reference point setting process.

FIG. 5 is a detailed flowchart of a reference point setting process according to the present embodiment.

As illustrated in FIG. 5, firstly, in step S501, the master image generating unit 211 generates an edge image based on the generated master image data.

Figures 6, 7:
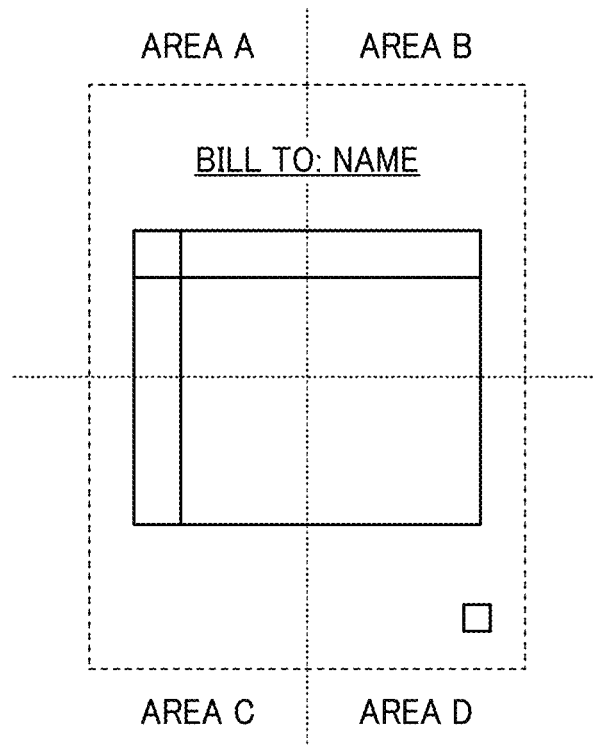
FIG. 6 is a diagram illustrating an aspect of area segmentation of an image to be processed.
FIG. 7 is a diagram illustrating an edge extraction filter.

Referring now to FIG. 6, a description is given of a user image data as a source of master image data (i.e., image data included in a print job) and a reference point setting area, which is an area for setting a reference point position. Note that an image indicated by the user image data is herein referred to as a user image.

FIG. 6 is a diagram illustrating an aspect of area segmentation of an image to be processed according to the present embodiment.

As illustrated in FIG. 6, the master image generating unit 211 divides a master image of a user image related to a bill into areas A to D to set reference point positions (i.e., target coordinates of the reference points). The master image generating unit 211 sets, as a reference point, a point far from the center of the entire image for each of the areas A to D. Note that the reference point setting area and the target coordinates of the reference points are freely settable.

Referring back to FIG. 5, in step S501, the master image generating unit 211 applies a filter as illustrated in FIG. 7 to the master image to generate an edge image.

FIG. 7 is a diagram illustrating an edge extraction filter according to the present embodiment.

For example, the master image generating unit 211 causes the filter as illustrated in FIG. 7 to act on all the pixels for each of the RGB planes of the master image, to generate the edge image. The filter illustrated in FIG. 7 is a general filter for extracting an edge of an image (that is, a shape included in a mask image) based on the difference between adjacent pixels.

Figure 8A:
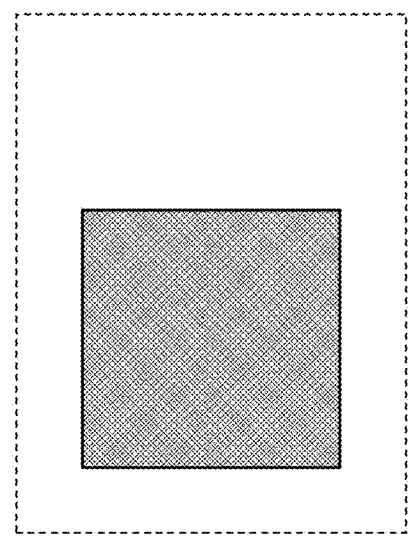
FIG. 8A is a diagram illustrating an original image.
Figure 8B:
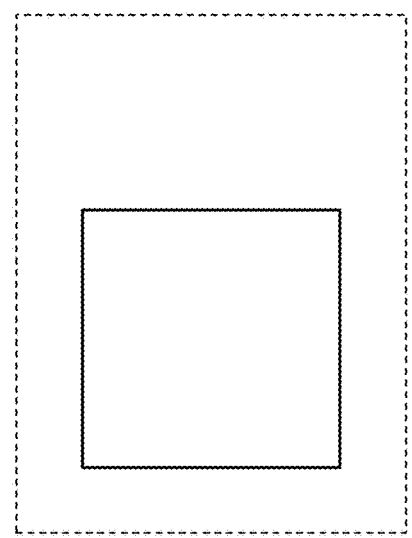
FIG. 8B is a diagram illustrating an edge image.
Figure 8C:
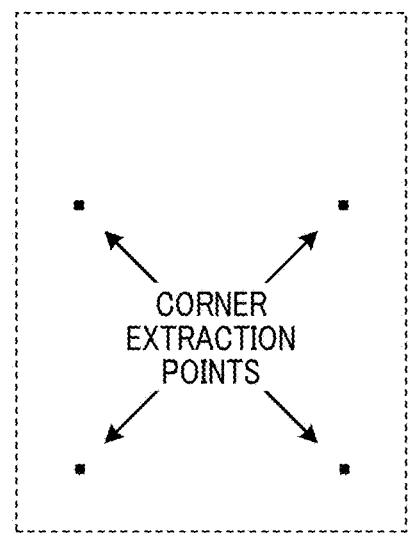
FIG. 8C is a diagram illustrating a corner detection image.

Referring now to FIGS. 8A to 8C, a description is given of aspects of edge extraction and corner extraction.

FIGS. 8A to 8C are diagrams illustrating the aspects of edge extraction and corner extraction. Specifically, FIG. 8A is a diagram illustrating an original image. FIG. 8B is a diagram illustrating an edge image. FIG. 8C is a diagram illustrating a corner detection image.

For example, the master image generating unit 211 applies the filter as illustrated in FIG. 7 to the image (i.e., the original image) as illustrated in FIG. 8A to extract an edge as illustrated in FIG. 8B.

After extracting the edge, the master image generating unit 211 detects corners of the edge with a corner detection filter.

FIGS. 9A to 9D illustrates examples of the corner detection filter according to the present embodiment.

Specifically, FIG. 9A is a diagram illustrating a first corner detection filter. FIG. 9B is a diagram illustrating a second corner detection filter. FIG. 9C is a diagram illustrating a third corner detection filter. FIG. 9D is a diagram illustrating a fourth corner detection filter.

In step S502 illustrated in FIG. 5, the master image generating unit 211 causes the corner detection filters as illustrated in FIGS. 9A to 9D to act on all the pixels for each of the RGB planes of the edge image for each of the reference point setting areas such as the areas A to D illustrated in FIG. 6, to extract the corners of the edge in the edge image generated as described above. Like the filter illustrated in FIG. 7, the filters illustrated in FIGS. 9A to 9D are used to extract corners of an image (specifically, corners of a shape in an image) based on the difference between adjacent pixels.

The master image generating unit 211 applies such filters to the edge image to extract the corners (i.e., the pixels exceeding a given threshold) as illustrated in FIG. 8C from the edge image as illustrated in FIG. 8B. After extracting the corners as illustrated in FIG. 8C, the master image generating unit 211 generates, as a corner coordinate table, information of the extracted corner pixels as reference point candidate pixels.

Figures 10, 11:
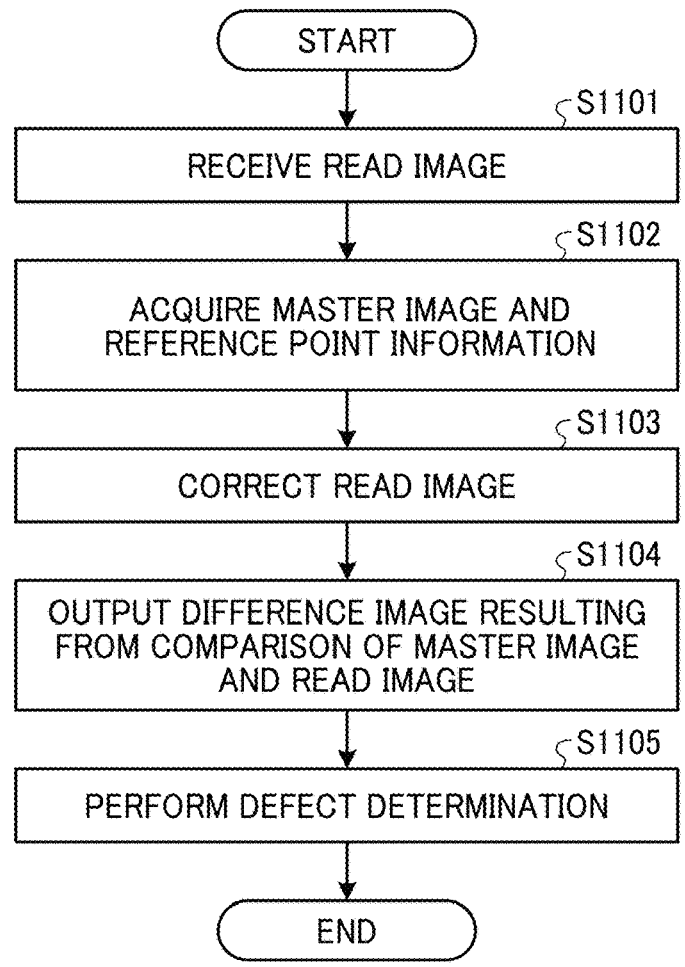
FIG. 10 is a corner coordinate table.
FIG. 11 is a flowchart of a comparative inspection process.

FIG. 10 is an example of the corner coordinate table according to the present embodiment.

As illustrated in FIG. 10, the master image generating unit 211 generates, as the information of the reference point candidate pixels, the information including numbers (numbers for uniquely identifying the reference point candidate pixels), coordinates (X and Y coordinates) indicating the respective positions of the reference point candidate pixels, and target planes. The table illustrated in FIG. 10 includes the "coordinates" of the corners extracted by the master image generating unit 211 in association with the "number."

In the present embodiment, the filter illustrated in FIG. 7 and the filters illustrated in FIGS. 9A to 9D are used to extract an edge of an image and corners of an image, respectively, as an example. Any other ways may be used to extract an edge of an image and corners of an image.

Note that the master image generating unit 211 performs the operations of steps S501 and S502 for each of the RGB colors. Thus, the master image generating unit 211 generates a table as illustrated in FIG. 10 for each of the RGB colors.

After completing the operation of step S502, in step S503, the master image generating unit 211 selects the coordinates farthest from the center of the image from the "coordinates" included in the table illustrated in FIG. 10 and sets the selected coordinates as a reference point, for each of the areas A to D illustrated in FIG. 6. Note that the master image generating unit 211 may set a corner of a sheet edge as a reference point when failing to specify coordinates far from the center of the image in each area.

In the operation of step S503, the master image generating unit 211 obtains the interval between the coordinates of the center of the image and each of the "coordinates" included in the table illustrated in FIG. 10. Then, the master image generating unit 211 selects the coordinates farthest from the coordinates of the center of the image, for each of the areas A to D. Alternatively, the priority order may be set among the coordinates for each of the areas A to D. In this case, the coordinates having the highest priority may be selected from the "coordinates" included in the table illustrated in FIG. 10.

In step S503, the master image generating unit 211 selects a reference point for each of the areas A to D. In other words, the master image generating unit 211 selects four reference points in total. Specifically, for each of the RGB colors, the master image generating unit 211 selects a reference point for each of the areas A to D, that is, four reference points in total. Then, the master image generating unit 211 generates information indicating how the selected reference points have been extracted. The master image generating unit 211 stores or sets, in a storage medium (e.g., the buffer 213), reference information, that is, table information (as a reference point selection result table) associating "plane" indicating any of the RGB, "area" indicating any of the areas A to D illustrated in FIG. 6, and selected "coordinates" with each other.

The master image generating unit 211 performs the operations described above to complete generation of a master image and selection or setting of reference points. The master image generating unit 211 inputs the generated master image data and the reference point selection result table to the buffer 213. Such an input allows the comparative inspection unit 215 to execute the comparative inspection with reference to the master image data and the reference point selection result table. As described above, the master image generating unit 211 generates an edge image from the master image and detects corners from the edge image. When extracting the corners as reference points, the master image generating unit 211 stores, in the buffer 213, a reference point selection result table based on the extracted result.

Referring now to FIG. 11, a description is given of a comparative inspection process executed by the comparative inspection unit 215 according to the present embodiment.

FIG. 11 is a flowchart of the comparative inspection process according to the present embodiment.

Before the comparative inspection unit 215 starts the comparative inspection process, the print image reading unit 214 acquires read image data indicating an image formed on each side of a sheet by the printer 101 and read by the reading device 400a and the reading device 400b. The print image reading unit 214 sends the acquired read image data to the comparative inspection unit 215.

In step S1101, the comparative inspection unit 215 acquires or receives the read image data from the print image reading unit 214.

In step S1102, the comparative inspection unit 215 acquires master image data and a reference point selection result table from the buffer 213.

In step S1103, the comparative inspection unit 215 corrects the read image so as to conform to a master image, according to the master image data and the information included in the reference point selection result table.

After completing the operation of step S1103, in step S1104, the comparative inspection unit 215 compares the pixels constructing the master image and the pixels constructing the read image to extract (or output) a difference image. In other words, the comparative inspection unit 215 outputs a difference image resulting from the comparison of the master image and the read image. When the image formation and output is suitably executed, the difference between the master image and the read image is relatively small. As a result, the corresponding pixels of the images have almost the same tones. That is, the difference (i.e., the difference value) resulting from the subtraction is close to 0. By contrast, when the image formation and output is not executed as intended, the corresponding pixels have different tones. That is, the difference (i.e., the difference value) resulting from the subtraction is not close to 0.

In step S1105, the comparative inspection unit 215 compares the difference value thus generated (i.e., the calculated difference) with a given threshold to perform a defect determination. In step S1105, the comparative inspection unit 215 may set a threshold for each of the RGB planes and compare the threshold with the calculated difference. Alternatively, the comparative inspection unit 215 may calculate the color shift of the entire lightness, hue, and saturation, based on the difference for each of the RGB planes and compare the calculated value with a threshold set for the value to determine the defect. As a result of such comparison, when the generated difference value does not exceed the threshold, the comparative inspection unit 215 determines that the read image is not defective. By contrast, when the generated difference value exceeds the threshold, the comparative inspection unit 215 determines that the read image is defective. In this case, the comparative inspection unit 215 extracts coordinate information of a portion exceeding the threshold (i.e., coordinate information of a defective portion) of the difference image.

When determining that the read image is not defective, the comparative inspection unit 215 sends, to the printer 101, information indicating that the read image is not defective. By contrast, when determining that the read image is defective, the comparative inspection unit 215 sends, e.g., the read image to the defect display unit 216.

Figure 12:
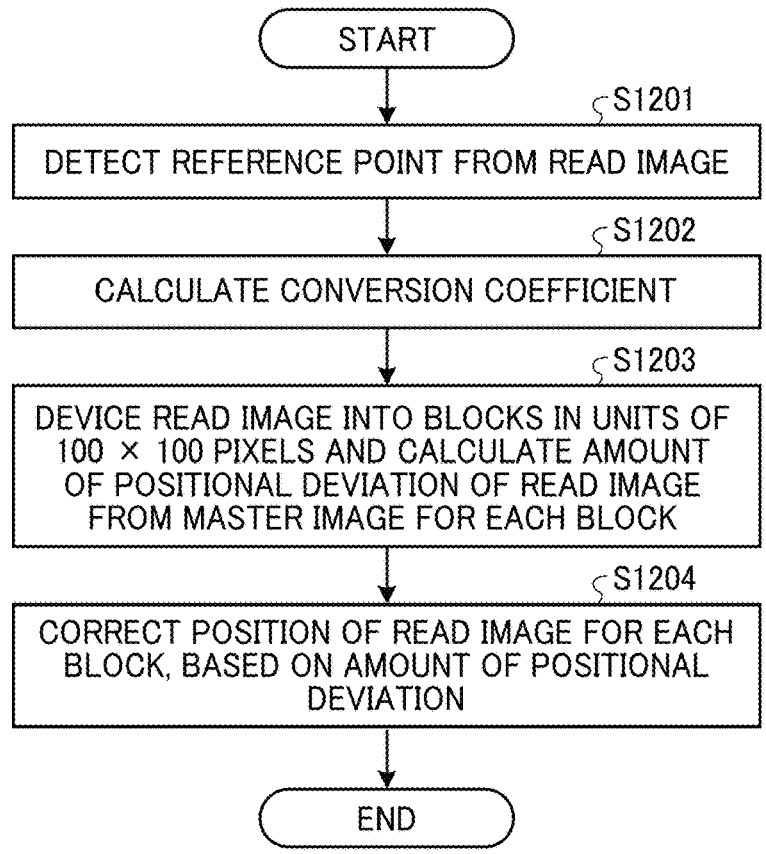
FIG. 12 is a flowchart of an operation of correcting a read image.

Referring now to a flowchart illustrated in FIG. 12, a detailed description is given of the operation of step S1103.

FIG. 12 is a flowchart of an operation of correcting a read image according to the present embodiment.

As illustrated in FIG. 12, in step S1201, according to the reference point selection result table set in the buffer 213, the comparative inspection unit 215 extracts a corresponding reference point from the read image.

For example, the comparative inspection unit 215 acquires the reference point coordinates extracted from the master image (i.e., the coordinates registered in the reference point selection result table) and performs the alignment based on the reference point coordinates. Specifically, the comparative inspection unit 215 performs pattern matching between a 32×32 pixel area centered on the reference point coordinates on the read image and a reference point image that is a 16×16 pixel image centered on the reference point coordinates on the master image, to search the 32×32 pixel area for an area that is a best match for the reference point image. Then, the comparative inspection unit 215 uses the center point of the area in the read image as the reference point coordinates.

After extracting the reference point coordinates in step S1201, in step S1202, the comparative inspection unit 215 calculates a coordinate conversion coefficient, which is a coefficient for projective transformation of the read image to the master image, from the reference point coordinates on the master image and the reference point coordinates on the read image.

Now, a description is given of an example of calculating the conversion coefficient. In the present example, the coordinates of a reference point "n" on the master image are represented by $(MX_n, MY_n)$; whereas the coordinates of the reference point "n" on the read image are represented by $(SX_n, SY_n)$. The conversion of the reference point coordinates on the read image to conform to the reference point coordinates on the master image is expressed as follows by a linear function:

$$MX_n = SX_n * A_x + SY_n * B_x + C_x; \text{ and}$$

$$MY_n = SX_n * A_y + SY_n * B_y + C_y,$$

wherein $C_x$ and $C_y$ are constants.

Since $C_x$ and $C_y$ are constants, the conversion coefficients $A_x$, $B_x$, $A_y$, and $B_y$ are calculatable with information of two reference points.

Note that, in step 1202, the comparative inspection unit 215 may calculate a scaling factor from the reference point coordinates on the master image and the reference point coordinates on the read image.

In step S1203, the comparative inspection unit 215 divides a read image into blocks in units of 100×100 pixels and calculates an amount of positional deviation of the read image from the master image for each block, with the coordinate conversion coefficient calculated in step S1202.

Subsequently, in step S1204, the comparative inspection unit 215 corrects the position of the read image for each block, based on the amount of positional deviation of the read image from the master image for each block. The comparative inspection unit 215 may perform resampling with the scaling factor described above.

Figure 13:
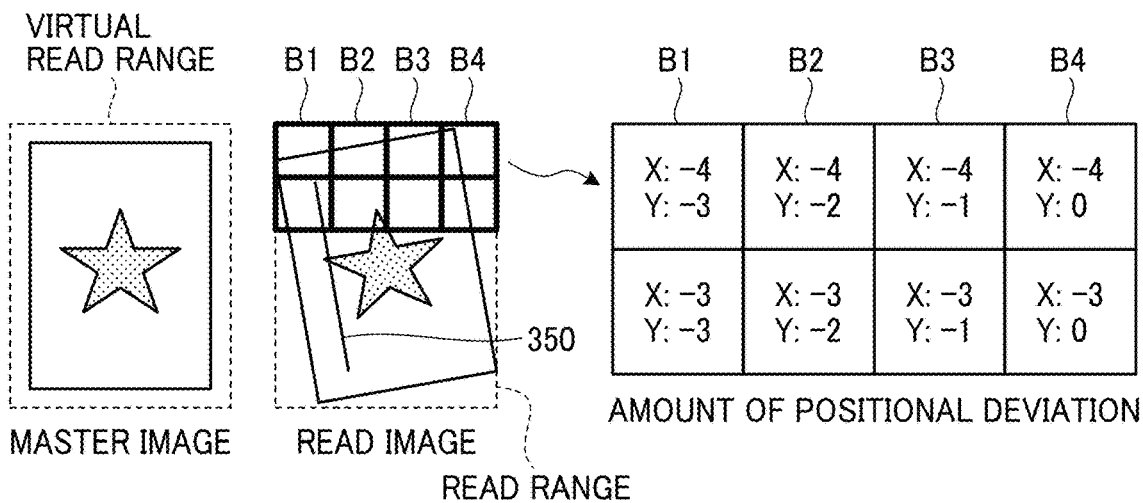
FIG. 13 is a diagram illustrating a positional deviation.

Referring now to FIG. 13, a description is given of the amount of positional deviation.

FIG. 13 is a diagram illustrating a positional deviation according to the present embodiment.

As illustrated in FIG. 13, a read image is tilted by a given amount with respect to a master image. In general, in a case in which a recording medium such as a sheet is conveyed by, e.g., a conveying roller, the posture of the recording medium may be tilted while being conveyed due to, e.g., the state of the conveying roller mounted, the eccentricity of the conveying roller, or the characteristics of the recording medium. When such a recording medium is read, the read data of the recording medium indicates a tilted image. In other words, the read image may be deviated depending on the conveyance of the recording medium. That is, the amount of positional deviation described above refers to an amount of deviation caused by conveyance of the recording medium.

Therefore, as described above, the comparative inspection unit 215 calculates the coordinate conversion coefficient. Then, as in the read image illustrated in FIG. 13, the comparative inspection unit 215 divides the read image into blocks (e.g., blocks B1, B2, B3, and B4) and calculates, with the coordinate conversion coefficient, an amount of positional deviation (i.e., an amount of deviation caused by conveyance of the recording medium) of the read image from the master image for each block. In the example of FIG. 13, the amount of positional deviation of the block B1 is −4 in an X direction and −3 in a Y direction. Note that the read image illustrated in FIG. 13 includes a defective image portion 350, which is a portion of an image abnormality. The defective image portion 350 is a so-called vertical streak. As described above, the comparative inspection unit 215 calculates, with the coordinate conversion coefficient, the amount of positional deviation of the read image from the master image for each block and compares the read image corrected based on the amount of positional deviation with the master image to detect an image abnormality.

When detecting an image abnormality in step S1105 illustrated in FIG. 11, the comparative inspection unit 215 sends, to the defect display unit 216, information indicating that an image abnormality is detected, the read image, information indicating a defective portion (i.e., coordinate information of a defective portion in the difference image), information indicating the relative positions of the master image and the read image, such as the amount of positional deviation, and the coordinate conversion coefficient. Note that, in step S1105, the comparative inspection unit 215 may not send the coordinate conversion coefficient to the defect display unit 216 provided that the comparative inspection unit 215 sends, to the defect display unit 216, the information indicating the relative positions of the master image and the read image, such as the amount of positional deviation.

Referring now to FIG. 14, a description is given of a process of outputting the information indicating a defective portion.

FIG. 14 is a flowchart of a process of outputting the information indicating a defective portion according to the present embodiment.

In step S1301, the defect display unit 216 acquires the information sent from the comparative inspection unit 215 in step S1105 illustrated in FIG. 11. Specifically, the defect display unit 216 acquires, from the comparative inspection unit 215, the information indicating that an image abnormality is detected, the read image, the information indicating a defective portion, the information indicating the relative positions of the master image and the read image, and the coordinate conversion coefficient.

Subsequently, in step S1302, the defect display unit 216 acquires information of the amount of positional deviation (i.e., the correction value) for coordinate conversion of a portion indicating the defective portion.

In step S1303, the defect display unit 216 corrects the coordinates of the defective position or the portion indicating the defective portion with the information of the amount of positional deviation (i.e., the correction value), adds highlighting information to the corrected position in the read image, and sends the information indicating that an image abnormality is detected and the read image with the highlighting information to the printer 101 so that the printer 101 displays the read image (including the defection portion). As described above, when the comparative inspection unit 215 detects an image abnormality, the defect display unit 216 corrects a portion of the image abnormality (i.e., a portion indicating a defective portion) based on the amount of positional deviation and outputs information including the highlighting information added to the corrected position in the read image.

Figure 15A:
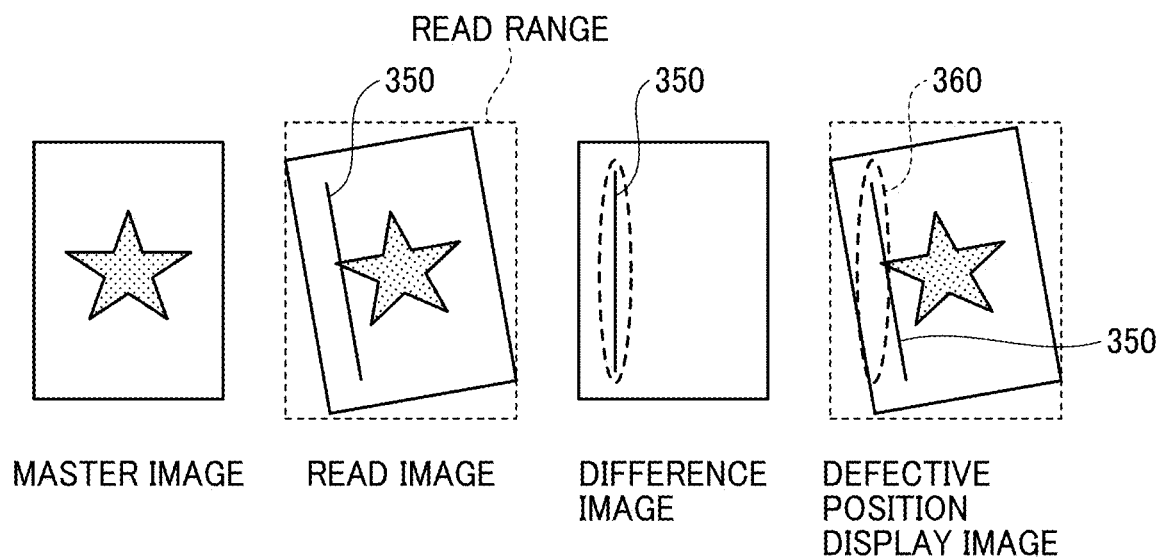
FIG. 15A is a diagram illustrating an example in which a portion indicating a defective portion is highlighted without being subjected to coordinate conversion.
Figure 15B:
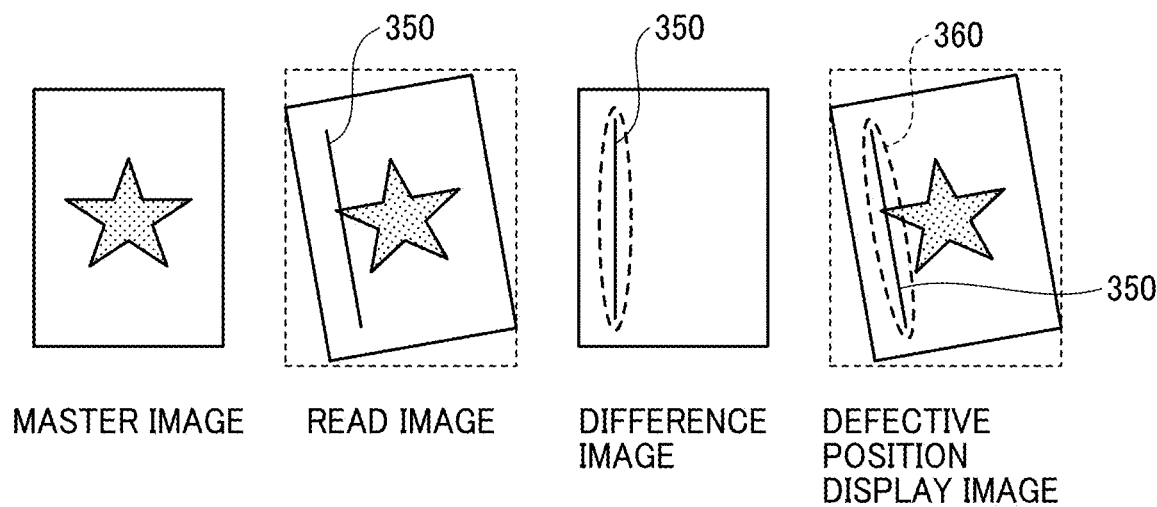
FIG. 15B is a diagram illustrating an example in which a portion indicating a defective portion is highlighted after being subjected to coordinate conversion.

Referring now to FIGS. 15A and 15B, a description is given of a comparison of an example in which a portion indicating a defective portion is highlighted without being subjected to coordinate conversion and an example in which a portion indicating a defective portion is highlighted after being subjected to coordinate conversion.

FIGS. 15A and 15B illustrate a comparison of an example in which a portion indicating a defective portion is highlighted without being subjected to coordinate conversion and an example in which a portion indicating a defective portion is highlighted after being subjected to coordinate conversion.

Specifically, FIG. 15A is a diagram illustrating an example in which a portion indicating a defective portion is highlighted without being subjected to coordinate conversion. As described above with reference to FIG. 13, the read image is tilted by a given amount with respect to the master image. As described above, the comparative inspection unit 215 calculates an amount of positional deviation with the coordinate conversion coefficient, corrects the read image data based on the amount of positional deviation, compares the corrected read image data with the master image data, and outputs the difference image data as a result of the comparison. When the read image includes the defective image portion 350, the difference image includes the defective image portion 350. Since the defective image portion 350 included in the difference image is based on the corrected read image, the position of the defective image portion 350 included in the difference image is different from the position of the defective image portion 350 in the read image before correction. Therefore, if highlighting information 360 is output in accordance with the defective image portion 350 in the difference image, the highlighting information 360 is displayed at a position deviating from the defective image portion 350 of the read image before correction, as illustrated in the "defective position display image" in FIG. 15A.

FIG. 15B is a diagram illustrating an example in which a portion indicating a defective portion is highlighted after being subjected to coordinate conversion. When the position of the defective image portion 350 of the difference image is coordinate-converted (or subjected to coordinate conversion) based on the amount of positional deviation and the highlighting information 360 is displayed based on the coordinate-converted position in the read image before correction, the highlighting information 360 is displayed at a position corresponding to the defective image portion 350 of the read image before correction, as illustrated in the "defect position display image" in FIG. 15B.

Note that, in the present embodiment, as described above as an example, a point farther from the center of the image is selected from reference point candidates obtained by corner extraction. Since a reference point set at a position closer to each of the four corners of a read image is deviated greater when the read image is contracted, it facilitates the detection of contraction of the read image to set the reference point at a position as close to each of the four corners of the read image as possible.

In the present embodiment, as described above with reference to FIGS. 9A to 9D as an example, different filters are applied to the areas A to D illustrated in FIG. 6 at the time of corner extraction. FIGS. 9A to 9D are filters for extracting different corner positions. Specifically, FIG. 9A illustrates a filter for extracting the upper left corner. FIG. 9B illustrates a filter for extracting the upper right corner. FIG. 9C illustrates a filter for extracting the lower left corner. FIG. 9D illustrates a filter for extracting the lower right corner. The filters illustrated in FIGS. 9A to 9D respectively correspond to the corners to be extracted from the areas A to D illustrated in FIG. 6.

However, the purpose of corner extraction is to extract characteristic points of an image. The areas A to D and FIGS. 9A to 9D may not always correspond to each other one by one as in the present embodiment. Alternatively, all of the filters illustrated in FIGS. 9A to 9D may be applied to each of the areas A to D to extract various kinds of corners from each of the areas A to D.

Targeting the types of corners to be extracted from each of the areas A to D as in the present embodiment allows extraction of corners that are highly likely to be extracted empirically alone, thus reducing the load and enhancing the efficiency of the processing.

In the present embodiment, as described above with reference to, e.g., FIGS. 8A to 8C as an example, extraction of an edge of an image is followed by extraction of corners of an edge image. Generating the edge image first allows targeting an object to be extracted as a corner, thus reducing the processing load. However, the generation of the edge image is dispensable. A corner extraction process may be performed on the master image, without generating the edge image.

Although not specifically described above in the present embodiment, the defect display unit 216 may change the type of the highlighting information depending on the type of image abnormality and output the highlighting information.

Referring now to FIGS. 16A to 16D, a description is given of an example in which the type of highlighting information is changed depending on the type of image abnormality.

Figure 16A:
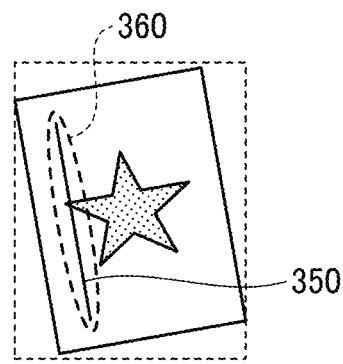
FIG. 16A is a diagram illustrating a first example of highlighting information.
Figure 16B:
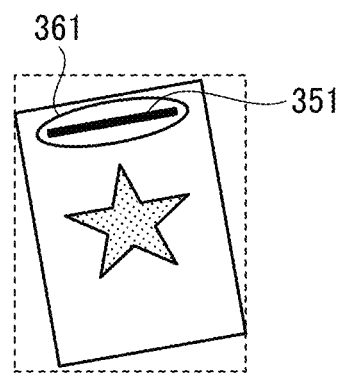
FIG. 16B is a diagram illustrating a second example of highlighting information.
Figure 16C:
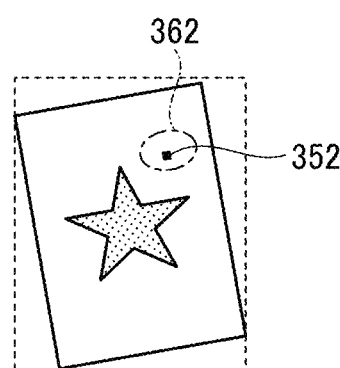
FIG. 16C is a diagram illustrating a third example of highlighting information.
Figure 16D:
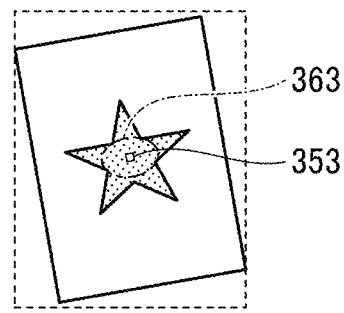
FIG. 16D is a diagram illustrating a fourth example of highlighting information.

FIGS. 16A to 16D illustrate an example in which the type of highlighting information is changed depending on the type of image abnormality. Specifically, FIG. 16A is a diagram illustrating a first example of highlighting information. FIG. 16B is a diagram illustrating a second example of highlighting information. FIG. 16C is a diagram illustrating a third example of highlighting information. FIG. 16D is a diagram illustrating a fourth example of highlighting information.

As illustrated in FIG. 16A, when the defective image portion 350 indicates a vertical streak, the highlighting information 360 of a dotted line is output. As illustrated in FIG. 16B, when a defective image portion 351 as a portion of an image abnormality indicates a lateral streak, highlighting information 361 of a solid line is output. As illustrated in FIG. 16C, when a defective image portion 352 as a portion of an image abnormality indicates dot contamination, highlighting information 362 of a one dot chain line is output. As illustrated in FIG. 16D, when a defective image portion 353 as a portion of an image abnormality indicates a white spot, highlighting information 363 of a two dot chain line is output.

Note that the correspondence between a portion of an image abnormality and the highlighting information is not limited to the correspondences illustrated in FIGS. 16A to 16D, provided that the portion of the image abnormality is distinguished. At least one of the thickness and color of a line to be outputted as the highlighting information may be changed. The highlighting information may be distinguished by a combination of the thickness and color of the line.

In the present embodiment, as described above as an example, the inspecting apparatus 103 sends, to the printer 101, an image including the highlighting information 360 that is added to the defective image portion 350 in the read image before correction. The printer 101 displays the image. Alternatively, for example, in a case in which the inspecting apparatus 103 is provided with a display (e.g., the operation device 102), the inspecting apparatus 103 may display, on the display, the image including the highlighting information 360 that is added to the defective image portion 350 in the read image before correction.

In the present embodiment, as described above as an example, the printer 101 sends a printed sheet to the inspecting apparatus 103. The print image reading unit 214 of the inspecting apparatus 103 reads an image formed on a surface of the printed sheet. Alternatively, for example, the printer 101 may have the function of the print image reading unit 214.

As described above, in the inspecting apparatus 103 of the present embodiment, the comparative inspection unit 215 calculates, with the coordinate conversion coefficient, an amount of positional deviation of a read image from a master image for each block and compares the read image corrected based on the amount of positional deviation with the master image to detect an image abnormality. When the comparative inspection unit 215 detects an image abnormality, the defect display unit 216 corrects a portion of the image abnormality (i.e., a portion indicating a defective portion) based on the amount of positional deviation and outputs information including the highlighting information added to the corrected position in the read image before correction. Accordingly, the inspecting apparatus 103 outputs the highlighting information corresponding to the position of the portion of the image abnormality of the read image. That is, when detecting an image abnormality (that is, when determining that the printed matter is defective), the inspecting apparatus 103 outputs information indicating the location of the image abnormality as appropriate.

In the present embodiment, as an example, the inspecting apparatus 103 serving as an information processing apparatus has been described in combination with the printer 101. Instead of the printer 101, the inspecting apparatus 103 according to an embodiment of the present disclosure may be combined with an image forming apparatus such as a copier, a scanner, a facsimile machine, or a multifunction peripheral (MFP) having at least two of copying, printing, scanning, and facsimile functions.

According to the embodiments of the present disclosure, when an image abnormality is detected as a result of comparison of a reference image and a read image, information indicating the image abnormality is output as appropriate.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

What is claimed is:

1. An information processing apparatus comprising circuitry configured to:
    acquire read image data of an image formed on a recording medium;
    acquire output target image data according to which the image is formed;
    generate, based on the output target image data, inspection image data for inspection of the read image data;
    compare the read image data corrected based on an amount of deviation caused by conveyance of the recording medium with the inspection image data generated, to detect an image abnormality; and
    highlight and output a position of a portion of the image abnormality in the read image data before correction, based on the amount of deviation caused by conveyance of the recording medium, in response to the image abnormality being detected.

2. The information processing apparatus according to claim 1,
    wherein the circuitry is configured to change a type of the highlight depending on a type of the image abnormality detected.

3. The information processing apparatus according to claim 1,
    wherein the circuitry is configured to divide the image indicated by the read image data into blocks of a given unit and calculate the amount of deviation for each of the blocks with a coefficient for projective transformation of the image indicated by the read image data to a position of an image indicated by the inspection image data.

4. An output method comprising:
    acquiring read image data of an image formed on a recording medium;
    acquiring output target image data according to which the image is formed;
    generating, based on the output target image data, inspection image data for inspection of the read image data;
    comparing the read image data corrected based on an amount of deviation caused by conveyance of the recording medium with the inspection image data generated, to detect an image abnormality; and highlighting and outputting a position of a portion of the image abnormality in the read image data before correction, based on the amount of deviation caused by conveyance of the recording medium, in response to the image abnormality being detected.

5. A non-transitory, computer-readable storage medium storing computer-readable program code that causes a computer to perform the output method according to claim 4.

6. The method according to claim 4, further comprising:
setting a type of the highlighting depending on a type of the image abnormality detected.

7. The method according to claim 4, further comprising:
dividing the image indicated by the read image data into blocks of a given unit and calculating the amount of deviation for each of the blocks with a coefficient for projective transformation of the image indicated by the read image data to a position of an image indicated by the inspection image data.

* * * * *